F. REGENOLD.
AUTOMATIC SAW TRIMMER FOR EQUALIZING LENGTHS OF LUMBER.
APPLICATION FILED AUG. 24, 1909.
977,750.
Patented Dec. 6, 1910.
2 SHEETS—SHEET 1.
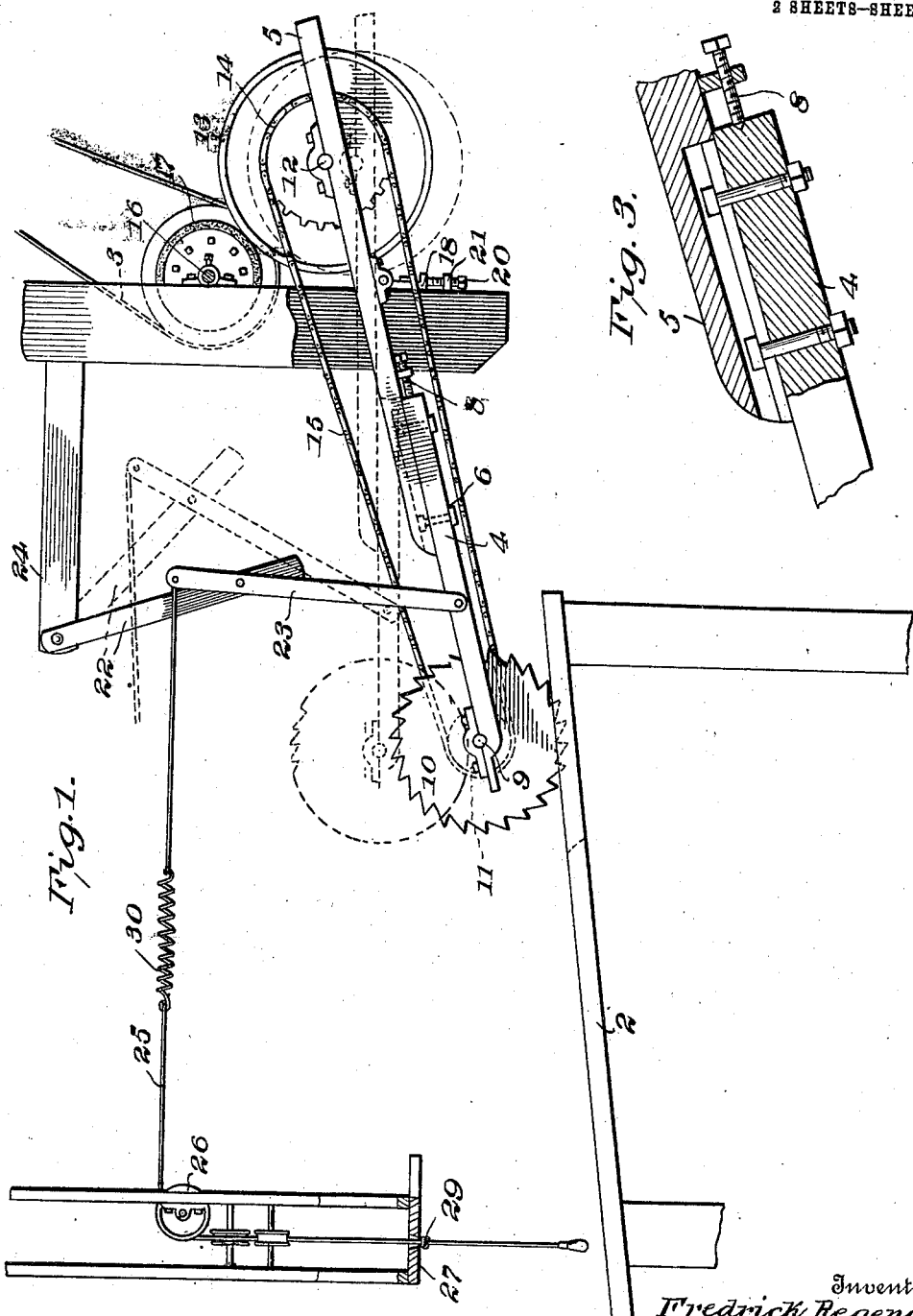
Inventor
Fredrick Regenold,
Witnesses
By
Attorneys

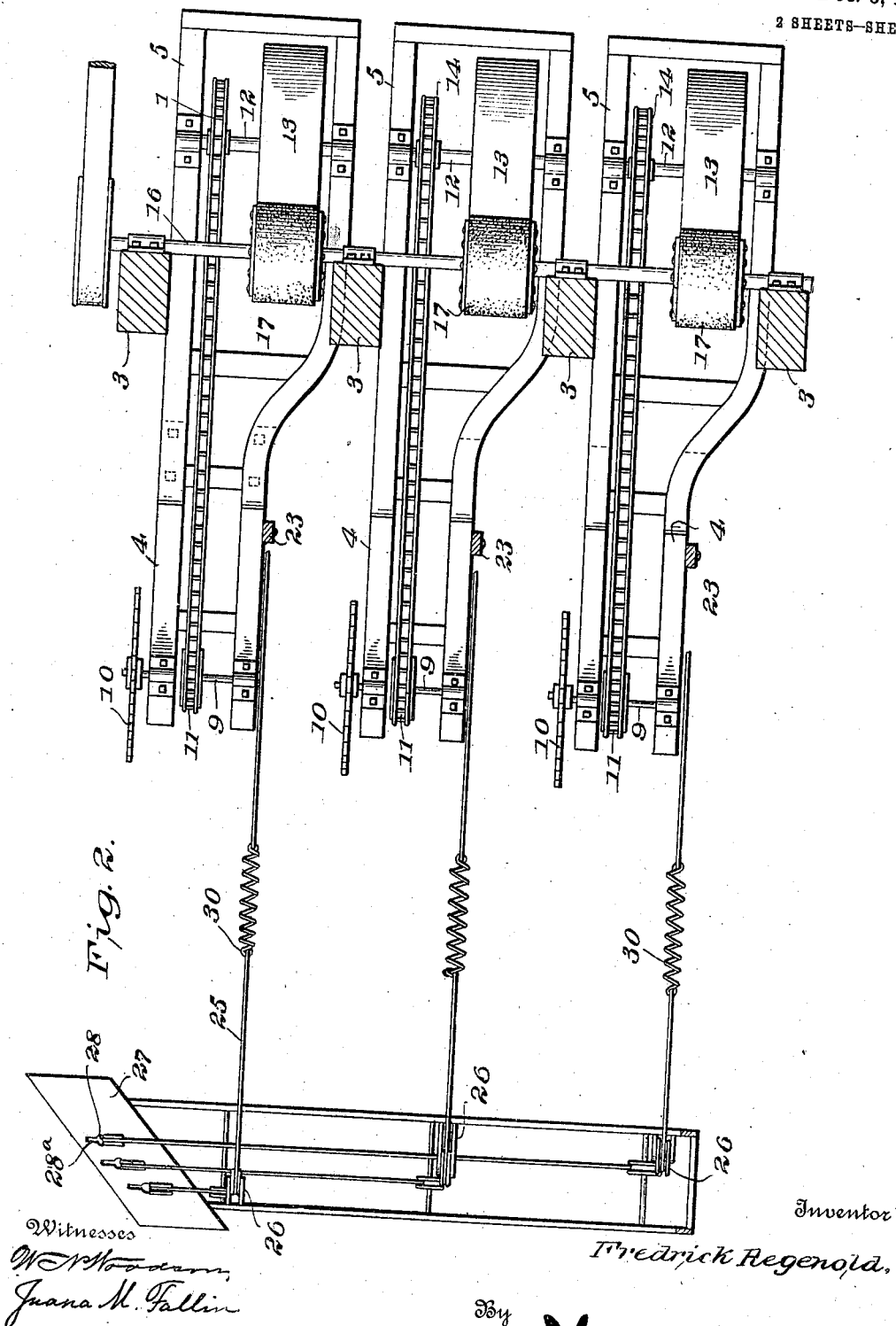

UNITED STATES PATENT OFFICE.

FREDERICK REGENOLD, OF MEMPHIS, TENNESSEE.

AUTOMATIC SAW-TRIMMER FOR EQUALIZING LENGTHS OF LUMBER.

977,750. Specification of Letters Patent. Patented Dec. 6, 1910.

Application filed August 24, 1909. Serial No. 514,420.

*To all whom it may concern:*

Be it known that I, FREDERICK REGENOLD, a citizen of the United States, residing at Memphis, in the county of Shelby and State of Tennessee, have invented certain new and useful Improvements in Automatic Saw-Trimmers for Equalizing Lengths of Lumber, of which the following is a specification.

My invention relates to mechanism for equalizing lengths of lumber, such mechanism usually consisting of a gang or plurality of saws supported in proximity to a table, the saws being connected to a driving means and being so arranged that all the saws not in use may be raised from engagement with the lumber being equalized.

In trimmers as at present used in sawmills, a plurality of saws and arbors are used, all the saws being driven from a common driving means, although only two saws are ever used at any time, yet all the saws, whether in use or out of use are constantly running at full speed.

The object of this invention is to obviate the inconvenience and loss of power due to the running of the saws which are not in use and to provide a mechanism wherein the saws which are not in use as trimmers shall be automatically held out of engagement with the saw driving mechanism, thus saving considerable power.

A further object of the invention is to provide in a mechanism of the kind above referred to, means for relieving the saw frame from any over strain if the saw should become dull and cause the frictional driving means used therewith to slip, thus avoiding any breakage of the machinery due to this cause.

In general terms the invention may be described broadly as including an independent saw supporting frame for each saw, these frames being pivotally mounted for independent movement. One end of each frame carries a rotatable saw, while the other end of the frame beyond the pivotal point carries a friction drive wheel with which the saw arbor is connected, so that the saw may be driven from the friction drive wheel. The friction drive wheel is heavy enough to counterbalance the weight of the saw and support it above the trimming table. Mounted above each friction drive wheel is a main friction drive wheel, driven by any suitable power, with which the drive wheel on the saw frame is adapted to engage when the saw is forced downward toward the trimming table and into its operative position. In connection with the pivoted saw frame, as above described, there is provided a means, preferably having the form of a toggle joint and actuated by a handle, whereby the saw supporting end of the saw frame may be forced downward to bring the saw into operation and to bring the friction drive wheel on the saw frame into engagement with the main friction drive wheel.

For a full understanding of the invention reference is to be had to the following description and accompanying drawings, in which:—

Figure 1 is a side elevation of my improved automatic trimmer. Fig. 2 is a plan view. Fig. 3 is a detail sectional view enlarged showing the means for adjusting the sections of the saw supporting frame.

Corresponding and like parts are referred to in the following description and indicated in all the views of the drawing by the same reference characters.

Referring to these figures, 2 designates a trimming table preferably inclined and slotted. Pivotally mounted upon supporting beams or brackets 3 are a series of saw supporting frames. Each frame is composed of two sections 4 and 5 mounted so as to have a sliding adjustable engagement with each other, so that the frame as a whole may be lengthened or shortened. For this purpose the section 5 may be provided with the headed studs 6 for engagement in a longitudinal slot, formed in the under face of the section 4.

An adjusting screw 8 passing through an eye carried by the section 5 may be used for adjusting the section 5 relative to the section 4. The extremity of the section 4 carries upon it a bearing for the saw arbor 9 upon which is mounted the circular saw 10 of any usual make. The saw arbor also carries the sprocket or belt wheel 11. The other extremity of the saw supporting frame, that is the outer end of the section 5 of said frame, carries upon it the bearing for the transverse shaft 12, which shaft has fixed upon it the gear wheel 13 and sprocket or belt wheel 14, a connection passing around the belt or sprocket wheels 10 and 14 so that the saw arbor is driven from the shaft 12. Preferably I use a sprocket chain 15 for this purpose engaging with the sprocket wheels on the arbor 9 and shaft 12. Preferably also the wheel 13 is a friction wheel and is made of metal so that its weight is great enough to counterbalance the weight of a saw and supporting arbor therefor, and hold the saw in a position raised from the table 2. Mounted upon the cross-piece 3 and above the gang of friction wheels 13 is the driving shaft 16 having thereon a plurality of driving gear wheels 17, these having preferably the form of friction wheels and being preferably of paper or covered with leather or other material having considerable frictional resistance so as to get a good frictional contact with the smooth face of the metallic friction wheel 13. It is to be understood that I do not wish to limit myself in any way to the construction of the wheel 17 or its material. I have shown in the figures each wheel as formed in sections with a paper body clamped between the sections.

It is necessary to provide means for adjusting the drive wheel 13 with relation to the drive wheel 17 so that the frictional contact between the two wheels may be properly regulated. For this I mount the bearing for the section 5 upon slides 18. Each slide is slotted and held to the lower portion of the bracket 3. by a nut and bolt. An adjusting screw 20 passes through an eye 21 on the brace and engages against an outwardly projecting flange on the slide 18. By adjusting this screw it will be obvious that the bearing for the saw frame will be raised or lowered to any desired height.

As a means of moving the saws and saw frame into operative position I provide each of the saw frames with an independent operating means acting to force the saw downward into working position with relation to the table 2 and to bring the drive wheel 13 into engagement with the drive wheel 17. For this purpose I provide pairs of toggle links 22 and 23 pivoted to each other, and at their opposed extremities pivoted one to the saw frames, and the other to over-head supports 24. The toggle links 23 project beyond their pivotal point and have each attached thereto a flexible connection 25 which extends over a pulley 26 and has an end depending into position to one side of the trimming table 2, where it is convenient to the hand of an operator. As a means for holding the flexible connection 25 lowered into position to hold the saws in engagement with the lumber, I provide the transverse plate 27 supported in any suitable manner above the table and having therein a plurality of key-hole slots, each slot having a relatively large portion 28 and a narrow portion 28$^a$. Each of the actuating cords 25 is provided with a stop 29, which stop is too large to pass through the narrowed portion of the slot 28$^a$. Hence when the actuating cords are pulled down, the stop 29 will engage beneath the portion 28$^a$ of the slotted plate 27 and be held down, whereas when the cords are moved laterally the stops will pass through the enlarged portion 28 of the slots.

It will be obvious that if the connection 25 was an unyielding one, the saw would be held into rigid engagement to the work, and would be subject to strain if the saw should become dull and cause the friction gears to slip upon each other. In order that if the saw becomes dull, the board operated upon may force the saw frame upward and thus avoid breakage, I provide in the connection 25 a spiral spring 30. This spring permits the saw to yield sufficiently to prevent the breakage referred to.

The advantages of my invention are obvious. It will be seen that any one of the saws may be brought into operative position with quickness and without in any way affecting the remainder of the saws. It will also be seen that as soon as the gear 13 is released from its engagement with the drive wheel 17 the saw attached thereto will be raised because of the counterbalancing weight of the wheel 13 and that as soon as raised the saw driving mechanism is drawn out of engagement with the main drive. Thus only two saws are being driven at any one time, and thus the drive shaft 16 is relieved from the strain of driving the remainder of the saws. This saves wear, tear and power and very much lessens the danger to the operator while he is oiling or working about the machine, both on account of the fewer saws which are ordinarily being driven, and also because he can entirely discharge all of the saws from engagement with the driving means with a minimum of trouble.

While I have shown a sprocket as used for driving the saws I do not wish to be limited to this as it is obvious that other driving connection might be used between the wheel 13 and the saw proper. Neither do I wish to be limited to the means of supporting the saw frames and to the means for holding the cords 13 in their adjusted position as it is obvious that all of these parts might be varied.

Having thus described the invention what is claimed as new is:—

1. In a lumber trimming mechanism, the combination with a trimming table of a plurality of pivotally supported saw frames, a saw arbor and saw carried upon one end of the frame, a gear wheel carried on the other end of the frame, the gear wheel end of each frame being heavier than the saw-carrying end to normally hold the saw above the trimming table, means for transmitting the motion of the gear wheel to its corresponding saw arbor, a common driving means mounted above the series of gear wheels and means for independently moving each saw frame to depress the saw-carrying end of the frame and bring the gear wheel carried on the other end of the frame into engagement with the driving means.

2. In a lumber trimming mechanism, the combination with a trimming table of a plurality of independent pivotally supported saw frames, a saw arbor and saw carried upon one end of each frame, a friction drive wheel carried upon the other end of the frame, means for transmitting the motion of the drive wheel to the saw arbor, a drive shaft common to all of said saws and mounted above the gear wheels thereof, friction drive wheels on said shaft engaging with the drive wheels of the saw frames, and means for independently depressing the saw-carrying end of each of the saw frames to bring its drive wheel into engagement with the common drive wheel or to elevate the saw carrying ends of the frames to disengage said friction wheels.

3. In a lumber trimming mechanism the combination with a trimming table of a plurality of independent pivotally supported saw frames, a saw arbor and saw carried upon one end of each frame, a friction driving wheel carried upon the other end of the frame, of a weight adapted to counterbalance the said saw, a driving mechanism between the drive wheel and the saw arbor, a common driving shaft for all of the saws, friction wheels carried thereon with which the friction wheels on the saw frames are adapted to engage, toggle links connected to the saw frames to depress the saw carrying end of any one frame, a connection to said toggle levers and means for holding said connection in an adjusted position to hold the saw-carrying ends of any one frame downward into engagement with the lumber on the trimming table.

4. In a lumber trimming mechanism, the combination with a trimming table, of a plurality of pivotally supported saw frames, a saw arbor and saw carried upon one end of each frame, a friction drive wheel carried upon the other end of the frame, means for transmitting the motion of the drive wheel to the saw arbor, a drive shaft common to all of said saws and mounted above the gear wheels thereof, friction drive wheels on said shaft and engageable with the drive wheels of the saw frames, means for independently depressing the saw-carrying end of each of the saw frames to bring its driving wheel into engagement with the common drive wheel or to elevate the saw carrying ends of the frame to disengage said driving wheels, said means being adapted to yield to permit the saw-carrying end of the frame to rise if the saw meets with an obstruction.

5. In a lumber trimming mechanism, the combination with a trimming table, of a plurality of independent pivotally supported saw frames, a saw arbor and saw carried upon one end of each frame, a friction wheel carried on the other end of the frame and acting as a weight counterbalancing said saw, a driving mechanism between the friction wheel and the saw arbor, a common driving shaft for all of the saws, friction wheels carried thereon with which the friction wheels on the saw frames engage, toggle links connected to each of the saw frames to depress the saw-carrying end of any one frame, a connection extending from each of said toggle links, means for holding said connection in an adjusted position to hold the saw-carrying end of any one frame into engagement with the lumber, said connection having a yielding resilient section in its length permitting the toggle links to move and the saw to rise if the saw meets an obstruction.

6. In a lumber trimming mechanism, the combination with a trimming table, of a plurality of pivotally supported saw frames counterbalanced so as to normally hold the saws away from the trimming table, a driving wheel mounted on each of the saw frames and connected to the saw arbor, a common driving shaft having driving wheels thereon with which the driving wheel on each frame is adapted to engage, said frames being made in sections adjustable longitudinally on each other.

In testimony whereof I affix my signature in presence of two witnesses.

FREDERICK REGENOLD. [L. S.]

Witnesses:
  W. T. WATTS,
  MELVIN L. HURST.